Figure 1:
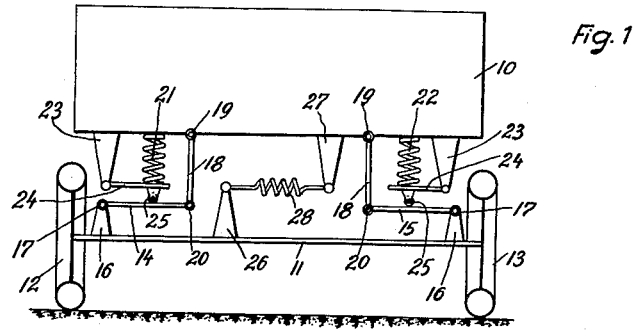

July 17, 1962  E. J. H. FIALA  3,044,799
VEHICLE PROVIDED WITH MEANS FOR CONTROLLING
ITS TRANSVERSE INCLINATION IN CURVES
Filed Jan. 9, 1959  2 Sheets-Sheet 1

Inventor
ERNST J. H. FIALA
BY Dicke and Craig
ATTORNEYS

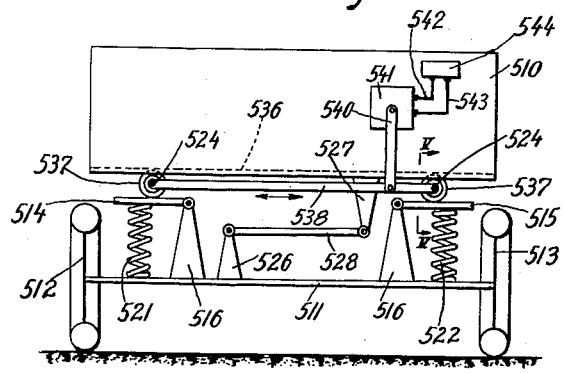
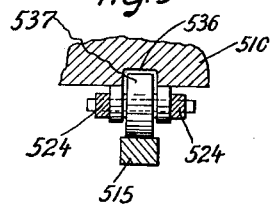
Inventor
ERNST J. H. FIALA

United States Patent Office 3,044,799
Patented July 17, 1962

3,044,799
VEHICLE PROVIDED WITH MEANS FOR CONTROLLING ITS TRANSVERSE INCLINATION IN CURVES
Ernst J. H. Fiala, Sindelfingen, Kreis Boblingen, Germany, assignor to Daimler-Benz Aktiengesellschaft, Stuttgart-Unterturkheim, Germany
Filed Jan. 9, 1959, Ser. No. 785,927
Claims priority, application Germany Jan. 11, 1958
19 Claims. (Cl. 280—112)

My invention relates to vehicles, particularly motor vehicles, and, more especially, to means for controlling the transverse inclination of the body of the vehicle in curves.

It is the object of my invention to provide means which so control the springs of the vehicle that in a curve the springs of the outer wheels are rendered less soft than the springs associated with the inner wheels enabling the springs to exert a force upon the body opposing the inclination produced by the centrifugal force.

Further objects of my invention will appear from a detailed description of a number of embodiments thereof described hereinafter with reference to the accompanying drawing. It is to be understood, however, that my invention is in no way limited to the details of such embodiments but is capable of numerous modifications within the scope of the apended claims and that the phrases and terms used in such detailed description have been chosen for the purpose of explaining the invention rather than that of restricting or limiting the same.

In the drawings

Figure 2:
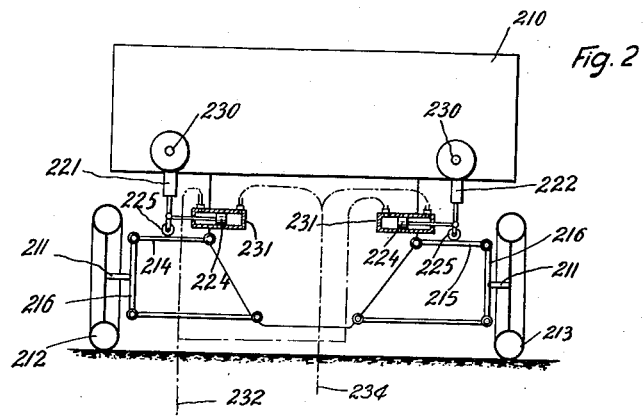
Figure 3:
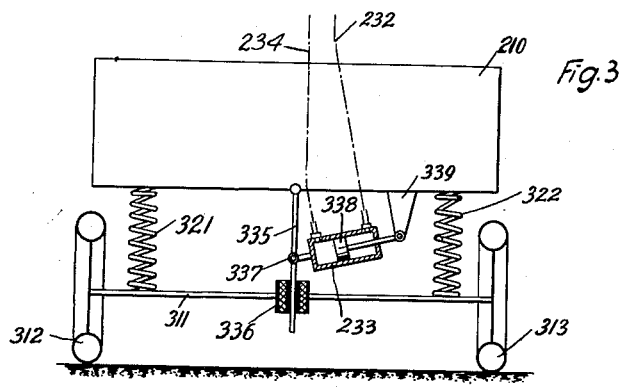

FIG. 1 is a diagrammatic front view of a vehicle having rigid axles and means for adjusting the springs parallel to themselves, FIG. 2 is a front view of a vehicle provided with pivotally mounted springs combined with a wheel suspension including parallel links, FIG. 3 is a rear view of the vehicle represented in FIG. 2 showing a hydraulic transmitter, FIG. 4 is a front view of a vehicle in which the springs are inserted between pivotal levers and the wheel unit and, FIG. 5 is a partial section of the vehicle shown in FIG. 4, said section being taken along the line V—V of FIG. 4.

In FIG. 1 I have illustrated a motor vehicle having a body 10 and a pair of rigid axles, one of which is shown at 11, each axle carrying a pair of wheels 12 and 13. The means for supporting the body 10 on each axle includes a pair of levers 14 and 15 extending transversely of the longitudinal axis of the vehicle in opposite directions. Each of these levers 14 and 15 has its outer end connected with the axle 11 by means of a bracket 16 fixed to the axle 11 and extending therefrom upwardly, and by a hinge 17 including a pivot extending parallel to the longitudinal axis of the vehicle. Each lever 14 has its inner end connected with the body 10 by a substantially upright link 18 connected by a pivot pin 19 to the body and by a pivot pin 20 to the lever. The load of the body 10 is transferred to the levers 14 and 15 by members 21 and 22, each of which is inserted between the body 10 and the lever 14, or 15 respectively, and is movable lengthwise of the lever for adjustment of the point of engagement therewith. In the embodiment illustrated in FIG. 1 this member is formed by a helical spring. Suitable means are provided for moving the load-transfer member 21 or 22 lengthwise of the lever 14, or 15 respectively. In the embodiment shown in FIG. 1 this means comprises brackets 23 rigidly connected to the body 10 and extending downwardly therefrom, and arms 24, each arm being linked to the lower end of the bracket 23 and extending inwardly therefrom and connected to the lower end of the spring 21, or 22 respectively, and carrying a roller 25 riding on the top face of the lever 14, or 15 respectively, when the body 10 and the brackets 23 fixed thereto move in response to centrifugal forces acting on the vehicle in curves. The means for supporting the body 10 on the axle 11 are so constructed as to afford the body 10 liberty of transverse displacement in response to such centrifugal forces. In the embodiment shown in FIG. 1 such means include an upwardly extending bracket 26 fixed to the axle 11, a downwardly extending bracket 27 fixed to the body 10 laterally offset from the bracket 26 and connected therewith by a resilient link 28 capable of compression and extension.

The operation is as follows:

Let it be assumed that the vehicle is driven through a curve and that the centrifugal force tends to displace the body 10 relative to the axle 11 towards the right. The amount of this displacement depends on the characteristic of the resilient link 28 which, under the assumed conditions, is subjected to a tensional stress. Therefore, the brackets 23 constitute means movable in response to centrifugal forces acting on the vehicle and connected with the means 24 for moving the members 21 and 22 for effecting adjustment of the point of engagement of the rollers 25 with the levers 14 and 15 in response to the centrifugal forces. As a result of this adjustment the point of engagement of one of the rollers 25 with the lever 15 is moved closer to the wheel 13 and to the pivot 17 adjacent thereto, whereas the point of engagement of the other roller 25 with the lever 14 is moved away from the wheel 12 and the pivot 17 adjacent thereto. Because of this adjustment of the points of engagement of the rollers 25 with the levers 14 and 15 coinciding with the points in which the load is transferred to these levers, the springing of the vehicle on the right-hand side is made harder, whereas the springing of the vehicle on the left-hand side is rendered softer. Therefore, the springs will have a tendency to tilt the body 10 in counterclockwise direction and this counteracts the tendency of the centrifugal force to tilt the vehicle body in clockwise direction. By suitably selecting the ratios of the leverage and the characteristic of the spring 28 I can even attain the effect that the body is inclined inwardly rather than outwardly in a curve as is highly desirable for riding comfort as the persons in the vehicle or goods transported therein are subject to lateral displacements by the centrifugal force to a minimized degree.

From the above explanation it will be appreciated that the resilient link 28 associated with the body 10 and the axle 11 is operative to restrain movement of the body 10 relative to the wheels 12 and 13 lengthwise of the levers 14 and 15 and that each link 24 extends substantially parallel to the lever 14, or 15 respectively, and has one of its ends connected to the body 10 by the bracket 23 and has the other one of its ends connected to the end of the spring 21 and 22 adjacent the lever 24.

In FIG. 2 I have shown a vehicle embodying my invention in which the axle 211 of each wheel of a pair of opposite wheels 212 and 213 projects outwardly from a wheel carrier 216 which is guided for up and down movement relative to the body 210 of the vehicle by a pair of fishbone links in a manner well known in the art. Each upper link constitutes a lever 214, or 215 respectively, to which the load of the body 210 is transferred by a spring strut 221, or 222 respectively, which is pivotally connected to the body 210 by a pivot pin 230 and at its lower end carries a roller 225 riding on the top face of the lever 214, or 215 respectively. In this embodiment the means for moving the member 221, or 222 respectively, lengthwise of the lever 214, or 215 respectively, for adjustment of the point of engagement therewith is formed by a piston 224 and a piston rod pivotally connected to the spring strut. The piston is movable in a cylinder 231 fixed to the body 210, one such cylinder being associated with each spring strut. As a result, the pivotal position of the spring struts depends on the position of the pistons 224 in the cylinders 231. These cylinders are connected by conduits 232 and 234 to a transmitter cylinder 233.

FIG. 3 illustrates the other pair of wheels 312, 313 of the vehicle illustrated in FIGURE 2. The body 210 is supported on the axle 311 of that other pair of wheels by suitable means so constructed as to afford the body liberty of transverse displacement in response to centrifugal forces. In FIG. 3 such means are diagrammatically represented as helical pressure springs 321 and 322. Moreover, suitable guiding means (not shown), such as means 26, 27 and 28 in FIG. 1, may be provided. An arm 335 depending from the center of the body 210 is pivotally connected thereto and slidably extends through a guiding sleeve 336 mounted in a rubber block fixed to the axle 311. An eye 337 fixed to one end wall of the cylinder 233 is pivotally connected with the arm 335 at a central point thereof located between the body 210 and the guiding sleeve 336. The transmitter cylinder includes a piston 338 having a piston rod which extends through the other end wall of the cylinder 233 and is pivotally connected to the lower end of a bracket 339 depending from the body 210 and rigidly fixed thereto. The conduit 232 extends from the right-hand end of cylinder 233 and has branches leading to the left-hand ends of the cylinders 231 (see FIGURE 2). Another conduit 234 extends from the left-hand end of cylinder 233 and has branch lines extending to the right-hand ends of the cylinders 231 (see FIGURE 2).

The operation is as follows:

When the vehicle rides through a curve, the centrifugal force tends to displace the end of the body 210 located above the axle 311 outwardly, for instance towards the right, thereby causing displacement of the piston 338 in the cylinder 233 towards the right. This displacement is transferred by the liquid in the conduits 232 to the cylinders 231 causing the pistons 224 therein to move to the right and to displace the spring struts in the same direction bringing them into an inclined position. The consequent displacement of the supporting points of the forces exerted by the spring struts 221 and 222 have a similar effect as in the embodiment shown in FIG. 1 in that the springing of the right-hand wheel 213 will get harder, where as the springing of the left-hand wheel 212 is getting softer. As a result, the spring struts tend to impart a counterclockwise inclination to the body 210.

In FIGS. 4 and 5 I have illustrated a vehicle embodying my invention in which the body 510 is supported on the axle 511 of the pair of opposite wheels 512 and 513 by means affording the body no liberty of transverse displacement, such means comprising an upstanding bracket 526 fixed to the axle 511 and a depending bracket 527 fixed to the body 510 and a link 528 pivotally connecting the ends of the two brackets and extending substantially parallel to the axle. The link 528 permits the body 510 to move up and down and to tilt in a transverse plane of the vehicle.

Moreover, the means for supporting the body 510 on the axle 511 includes a pair of levers 514 and 515 extending transversely of the longitudinal axis of the vehicle in opposite directions, each of these levers having its inner end pivotally connected with the axle 511 by means of a bracket 516 extending upwardly from the axle 511 to which it is fixed, helical pressure springs 521 and 522 being inserted between the axle 511 and the levers 514 and 515.

A pair of carriages 524 serves to transfer the weight of the body 510 to the levers 514 and 515, each carriage being inserted between the body and one of these levers. Each carriage has a pair of small rollers running on tracks provided on the bottom of the body 510 and extending transversely thereof, and a larger roller 537 running on the top face of the lever 514, or 515 respectively. The pair of carriages is formed by the bifurcated ends of a bar 538 compelling these carriages to move in unison with each other. In order to afford the larger rollers 537 the required space, the bottom of the body 510 is provided with a transverse groove 536 into which these rollers extend.

The carriages 524 constitute members inserted between the body 510 and the levers 514 and 515 and being movable lengthwise of these levers for adjustment of the points of engagement therewith. The means 538 for moving the members 524 is connected by a pivotal arm 540 with the shaft of a servo-motor 541 mounted on the body 510. By causing the servo-motor 541 to rotate its shaft in one direction or the other, the rod 538 is moved to the right or to the left. The servo-motor 541, which may be an electric motor, is connected by electrical conductors 542 and 543 with a control device 544 which may be an inclinometer responsive to centrifugal forces and capable of so controlling the servo-motor 541 as to swing the arm 540 thereof through an angle commensurate with the magnitude of the centrifugal force. Alternatively, the device 544 may be connected with the steering mechanism of the vehicle to thereby cause the arm 540 to be swung through an angle commensurate with the angle through which the steering wheel is turned from its normal position.

The operation is as follows:

When the vehicle rides through a curve in which the centrifugal force is directed towards the right, the instrument 544 responds to such centrifugal force and so controls the servo-motor 541 that the latter swings its arm 540 and the bar 538 connected therewith to the left. As a result, the torque exerted by the load of the vehicle upon the lever 514 is increased, whereas the torque imposed by the load of the vehicle upon the lever 515 is reduced. Therefore, the springs 521 and 522 tend to turn the levers 514 and 515 in anticlockwise direction, thus counteracting the effect of the centrifugal force upon the body 510 tending to tilt it clockwise about its longtudinal axis. If desired, this tendency of the centrifugal force may be entirely compensated or partly compensated or overcompensated.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle, the combination comprising a body, at least one pair of oppositely disposed wheels and axles for carrying said wheels, means for supporting said body on said wheels including a lever associated with each of said pair of oppositely disposed wheels extending transversely of the longitudinal axis of said vehicle, each of said levers having one end connected with the axle adjacent said associated wheel, a member inserted between said body and each of said levers and movable lengthwise of said lever for adjustment of the point of engagement between said body and said lever, means for moving each of said members associated with said wheels simultaneously in the same direction during the traversing of a turn, and means movable in response to centrifugal forces acting on the vehicle and connected with said means for moving said members for effecting adjustment of said point of engagement in response to said centrifugal forces.

2. The combination claimed in claim 1 in which said means for supporting said body on said axles are constructed to afford said body liberty of transverse displacement in response to centrifugal forces, and wherein said means for moving each said member includes a first fluid-operable piston, said means movable in response to centrifugal forces includes a second piston connected with said body for movement in response to said displacement, and fluid conducting means connecting said second piston with each of said first pistons and including a fluid for the transfer of movement of said second piston to said first piston.

3. In a motor vehicle, the combination as defined in claim 1, wherein each said member is a carriage inserted between said body and one of said levers including a roller running on said body and said one lever for adjustment of said point of engagement between said body and said one lever, and wherein said means for moving said members simultaneously in the same direction includes means rigidly connecting said carriages.

4. In a motor vehicle, the combination comprising a body, at least two opposite wheels and axles carrying said wheels, means for supporting said body on said two opposite wheels including two levers extending transversely of the longitudinal axis of said vehicle, each lever having one end connected with the axle adjacent one of said opposite wheels and the other end pivotally connected with the vehicle body for up-and-down guidance of said axle relative to said body, two members, each of which is inserted between said body and one of said levers and is movable lengthwise of said one lever for adjustment of the point of engagement therewith, and means for moving said two members simultaneously in the same direction during the traversing of a turn.

5. In a motor vehicle, the combination comprising a body, at least one pair of oppositely disposed wheels and axles carrying said wheels, means for supporting said body on said wheels including a lever associated with each of said oppositely disposed wheels extending transversely of the longitudinal direction of the vehicle and having one end thereof pivotally connected with said axle adjacent said associated wheel, a member inserted between each of said levers and said body, and movable lengthwise of said lever for adjustment of the point of contact between said member and said lever, means for moving said members simultaneously in the same direction to adjust the points of contact between said members and said levers, and means for restraining the movement of said members to thereby restrain movement of said body relative to said wheels lengthwise of said levers.

6. In a vehicle, the combination as defined in claim 5, wherein said means for moving the members associated with each of said pair of oppositely disposed wheels move said members simultaneously in the same direction during the traversing of a turn by the vehicle.

7. In a vehicle, the combination as defined in claim 6, wherein said member is a spring.

8. In a vehicle, the combination as defined in claim 7, wherein said spring is attached to said body and inserted between said lever and said body.

9. In a motor vehicle, the combination comprising a body, at least one pair of oppositely disposed wheels and an axle carrying said pair of oppositely disposed wheels, means for supporting said body on said axle including a lever associated with each of said wheels extending transversely of the longitudinal direction of the vehicle and located substantially in a plane extending parallel to said axle and said body and having one end thereof pivotally connected with said axle adjacent said associated wheel and the other end thereof pivotally connected with said body, a spring attached to said body and inserted between each of said levers and said body, the point of contact between each of said springs and associated lever being adjustable lengthwise of said lever, means for moving said spring to adjust the said point of contact including an arm and a roller inserted between said spring and said lever and connected to said body, and means for restraining said movement of said spring including a resilient means connected between said axle and said body.

10. In a vehicle, the combination as defined in claim 9, wherein said means for moving the springs associated with each of said pair of oppositely disposed wheels moves said springs simultaneously in the same direction during the traversing of a turn by the vehicle.

11. In a motor vehicle, the combination comprising a body, at least one pair of oppositely-disposed wheels and axles for carrying said wheels, means for supporting said body on said wheels including a lever associated with each of said pair of oppositely-disposed wheels extending transversely of the longitudinal axis of said vehicle, each of said levers having one end connected with the axle adjacent said associated wheel, a member inserted between said body and each of said levers and movable lengthwise of said lever for adjustment of the point of engagement between said body and said lever, means for moving each of said members associated with said wheels simultaneously in the same direction during the traversing of a turn, a servomotor connected with said means for moving said member for effecting adjustment of said point, and means responsive to centrifugal forces acting on the vehicle and connected with said servomotor to control the same in dependence on said centrifugal force.

12. The combination claimed in claim 11 in which each said member inserted between said body and said lever is a spring having its upper end pivotally connected to said body and having its lower end connected to said means for moving said member.

13. The combination claimed in claim 11 further comprising a spring inserted between each said lever and said axle.

14. The combination claimed in claim 13 in which each said member is a carriage having rollers running on said lever and on said body.

15. In a motor vehicle, the combination comprising a body, at least one pair of oppositely-disposed wheels and axles for carrying said wheels, means for supporting said body on said wheels including a lever associated with each of said pair of oppositely-disposed wheels extending transversely of the longitudinal axis of said vehicle, each of said levers having one end connected with the axle adjacent said associated wheel, a member inserted between said body and each of said levers and movable lengthwise of said lever for adjustment of the point of engagement between said body and said lever, said body being movable relative to said wheels transversely of the longitudinal axis of the vehicle in response to centrifugal forces, and means for moving each of said members associated with said wheels simultaneously in the same direction during the transversing of a turn, said means for moving said member being connected to said body for actuation thereof in response to said centrifugal forces and for subsequent adjustment of said point of engagement.

16. The combination claimed in claim 15 in which each said member is a spring.

17. In a motor vehicle, the combination comprising a body, at least one pair of oppositely-disposed wheels and axles for carrying said wheels, means for supporting said body on said wheels including a lever associated with each of said pair of oppositely-disposed wheels extending transversely of the longitudinal axis of said vehicle each of said levers having one end connected with the axle adjacent said associated wheel, a substantially upright link connecting the other end of each said lever with said body, a member inserted between said body and each of said levers and movable lengthwise of said lever for adjustment of the point of engagement between said body and said lever, said member being a spring movable in unison with said body lengthwise of said lever, and means for moving each of said members associated with said wheels simultantously in the same direction during the traversing of a turn.

18. The combination claimed in claim 17 further comprising resilient means associated with said body and said axles and operative to restrain movement of said body relative to said wheels lengthwise of said levers.

19. The combination claimed in claim 17 further comprising a second link extending substantially parallel to said lever and having one of its ends connected to said body and the other one of its ends connected to the end of said spring adjacent to said lever.

References Cited in the file of this patent

UNITED STATES PATENTS

| | | |
|---|---|---|
| 2,223,741 | Rabe | Dec. 3, 1940 |
| 2,349,175 | Kolbe | May 16, 1944 |
| 2,787,474 | Brueder | Apr. 2, 1957 |
| 2,804,311 | Uobanz | Aug. 27, 1957 |

FOREIGN PATENTS

| | | |
|---|---|---|
| 1,122,404 | France | May 22, 1956 |
| 68,500 | France | Nov. 12, 1957 |
| | (2nd addition to 1,100,585) | |